(12) United States Patent
Beyer et al.

(10) Patent No.: US 7,240,536 B2
(45) Date of Patent: Jul. 10, 2007

(54) TEST-GAS LEAK DETECTOR

(75) Inventors: Christian Beyer, Köln (DE); Hermann Boy, Kerpen (DE); Rainer Hölzer, Hürth (DE); Gunter Holstein, Köln (DE)

(73) Assignee: Oerlikon Leybold Vacuum GmbH, Cologne (DE)

( * ) Notice: Subject to any disclaimer, the term of this patent is extended or adjusted under 35 U.S.C. 154(b) by 0 days.

(21) Appl. No.: 10/546,666

(22) PCT Filed: Dec. 19, 2003

(86) PCT No.: PCT/EP03/14589

§ 371 (c)(1),
(2), (4) Date: Aug. 23, 2005

(87) PCT Pub. No.: WO2004/077005

PCT Pub. Date: Sep. 10, 2004

(65) Prior Publication Data

US 2006/0169028 A1    Aug. 3, 2006

(30) Foreign Application Priority Data

Feb. 27, 2003    (DE)  ................. 103 08 420

(51) Int. Cl.
*G01M 3/04* (2006.01)
(52) U.S. Cl. .......................................... 73/40.7; 73/40
(58) Field of Classification Search .................... 73/40, 73/40.7
See application file for complete search history.

(56) References Cited

U.S. PATENT DOCUMENTS

| 5,165,872 | A | 11/1992 | Fleischmann et al. |
| 5,561,240 | A | 10/1996 | Ochiai et al. ................. 73/40.7 |
| 5,634,778 | A * | 6/1997 | Liegel et al. ................. 417/313 |
| 5,733,104 | A | 3/1998 | Conrad et al. ............. 417/44.1 |
| 6,457,954 | B1 | 10/2002 | Adamietz et al. ........ 417/423.4 |
| 6,582,199 | B1 * | 6/2003 | Volkmann ................... 417/178 |
| 2002/0100313 | A1 | 8/2002 | Abbel ............................. 73/40 |

FOREIGN PATENT DOCUMENTS

| DE | 31 24 205 A1 | 12/1982 |
| DE | 195 23 430 A1 | 1/1996 |
| EP | 0 603 694 A1 | 6/1994 |
| WO | WO 99/61799 | 12/1999 |

* cited by examiner

*Primary Examiner*—Daniel S. Larkin
(74) *Attorney, Agent, or Firm*—Fay Sharpe LLP

(57) ABSTRACT

A test-gas leak detector (1) includes a connection (27) for a device under test, a sniffer, or a leak detector chamber, a high-vacuum pump (2), a test-gas detector (5) that is connected on the intake side of said pumps, and a test-gas conduit (28) leading from the connection of the leak detector (27). The conduit is connected to at least one intermediate stage of the high-vacuum pump (2) in addition to the pre-vacuum zone of the high-vacuum pump (2) via conduit sections (31, 32, 35) and valves (33, 34, 36). A housing (9), in which at least some of the conduits and valves and the high-vacuum pump (2) are integrated, forms part of the leak detector (1) and a detachable slide-in module (51) forms part of the high-vacuum pump. The slide-in module has an external jacket construction (53) comprising passages (58, 61) and when the leak detector (1) is operational, is situated in a receiving opening (52) that is provided in the housing (9).

17 Claims, 2 Drawing Sheets

TEST-GAS LEAK DETECTOR

BACKGROUND

The present invention relates to test-gas leak detectors.

A leak detector is known from the publication DE 31 24 205 A1. It comprises a high-vacuum pump designed by way of a turbomolecular pump to the inlet of which a test-gas detector is connected, as well as a forevacuum pump. Moreover, the high-vacuum pump is equipped with an intermediate inlet and an outlet. Connected to these connections is a system of conduits which besides the conduits exhibits valves and connections for a device under test and for the forevacuum pump. The components stated are arranged such that the device under test is linked through a first valve to the intermediate inlet of the high-vacuum pump. Moreover, the device under test is connected through a second valve to the inlet of the forevacuum pump. Finally, also the outlet of the high-vacuum pump is connected through a third valve to the inlet of the forevacuum pump.

The construction of the known test-gas leak detector is involved since it consists of a multitude of individual components. Disadvantageous is, moreover, the adaptation of the properties of the test-gas leak detectors to differing leak search methods or devices under test. To this end the high-vacuum pump needs to be replaced by a different type having properties which are adapted to the changed circumstances. This requires that the system of conduits and valves and the test-gas detector be separated from the connections of the high-vacuum pump and thereafter be connected to the connections of the new high-vacuum pump in a vacuum-tight manner. This complexity is all the greater the more intermediate connections the high-vacuum pump has. From U.S. Pat. No. 5,561,240, it is known to equip the high-vacuum pump with several intermediate connections. Embodiments of this kind are lately being used evermore frequently.

SUMMARY

It is the task of the present invention to simplify the design of a test-gas leak detector of the aforementioned kind and to reduce the assembly complexity necessary in the instance of adapting the leak detector to differing leak searching methods or devices under test.

Through the integration of the multitude of the components within the enclosure of the leak detector, shorter distances and thus faster pumping down of devices under test, shorter response times of the leak detector as well as a reduction in the regeneration times in the leak detector are attained. Through the simple usage of a detachable slide-in module being part of the high-vacuum pump not only the desired simplification regarding the adaptation of the properties of the high-vacuum pump to the multitude of customers requirements is attained, but also a considerable reduction in costs is accomplished.

As to how the slide-in module needs to be designed, can be taken from U.S. Pat. No. 6,457,954. The jacket construction has substantially only the function of ensuring the mutual relationship between the individual components of the high-vacuum pump (stator, motor, shaft, rotor). The function of the otherwise commonly employed housing of the high-vacuum pump, specifically that of sealing the active pumping components towards the outside and contributing towards connecting the pump to the test-gas detector (carrier of a connection flange, connection to intermediate inlets) is performed by the housing of the leak detector. There in fact exists basically the possibility that the slide-in module consists of two or three sections; however, expediently it comprises a uniform stable structure which can be fitted as a whole and which is detachable.

For the purpose of adapting the leak detector to different conditions, it is thus only required to replace the detachable slide-in module. For example, in that the passages in the jacket construction of the slide-in module exhibit changed cross-sections, the pumping speed of the test-gas leak detector can be adapted to changed circumstances. Here it is of advantage that the removal, respectively replacement of the slide-in module does not influence the positions of the valves in any way, i.e. does not involve any unwanted opening of connecting channels.

Finally, in that the housing of the leak detector is easily separable from the slide-in module of the high-vacuum pump, there exists the advantage that as the housing of the leak detector, a cast high-vacuum block with integrated channels and components as well as therein provided receptacles for the slide-in module can be employed.

Still further advantages of the present invention will be appreciated to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
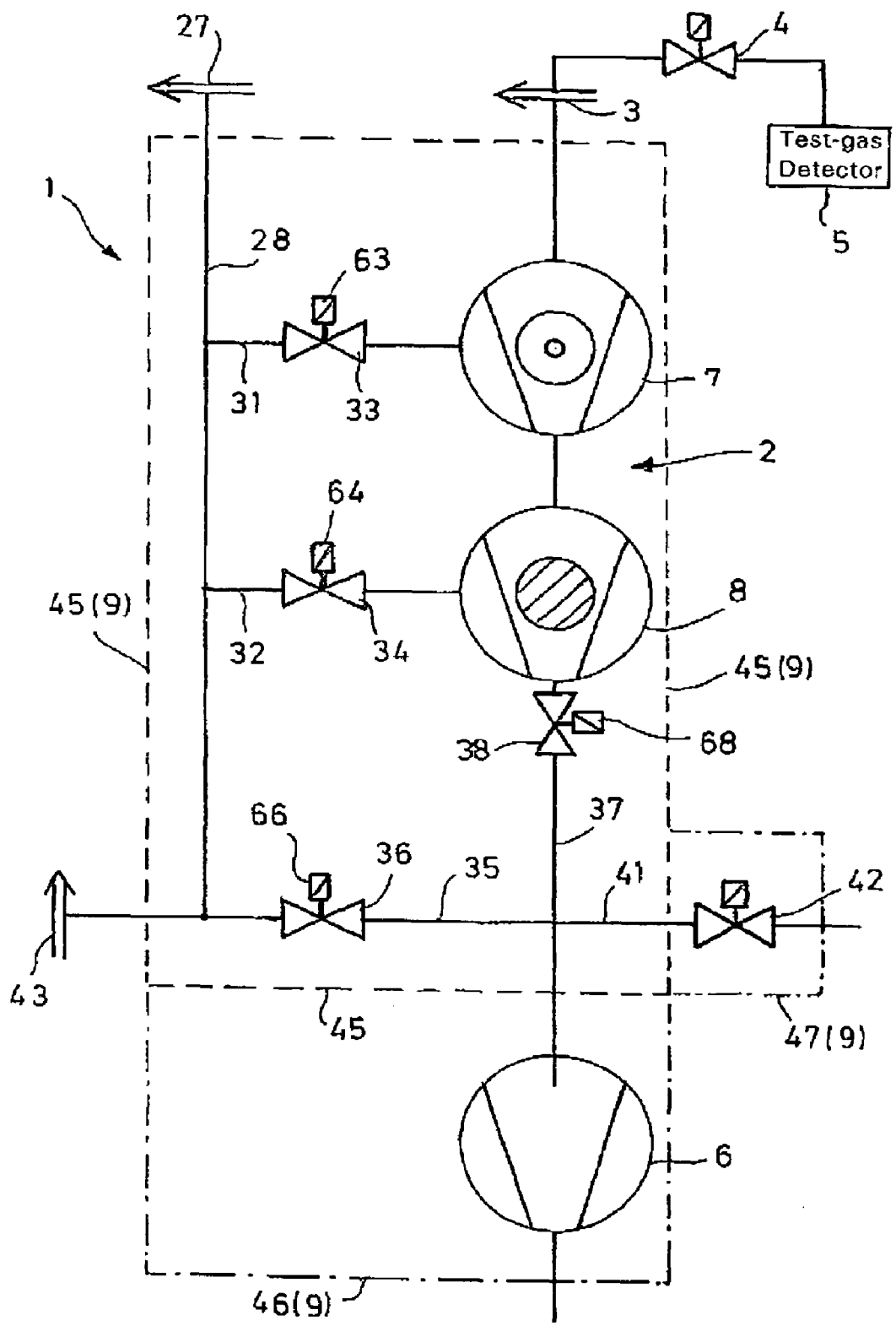
FIG. 1 illustrates a vacuum schematic for a leak detector of the kind in accordance with the present invention.
Figure 2:
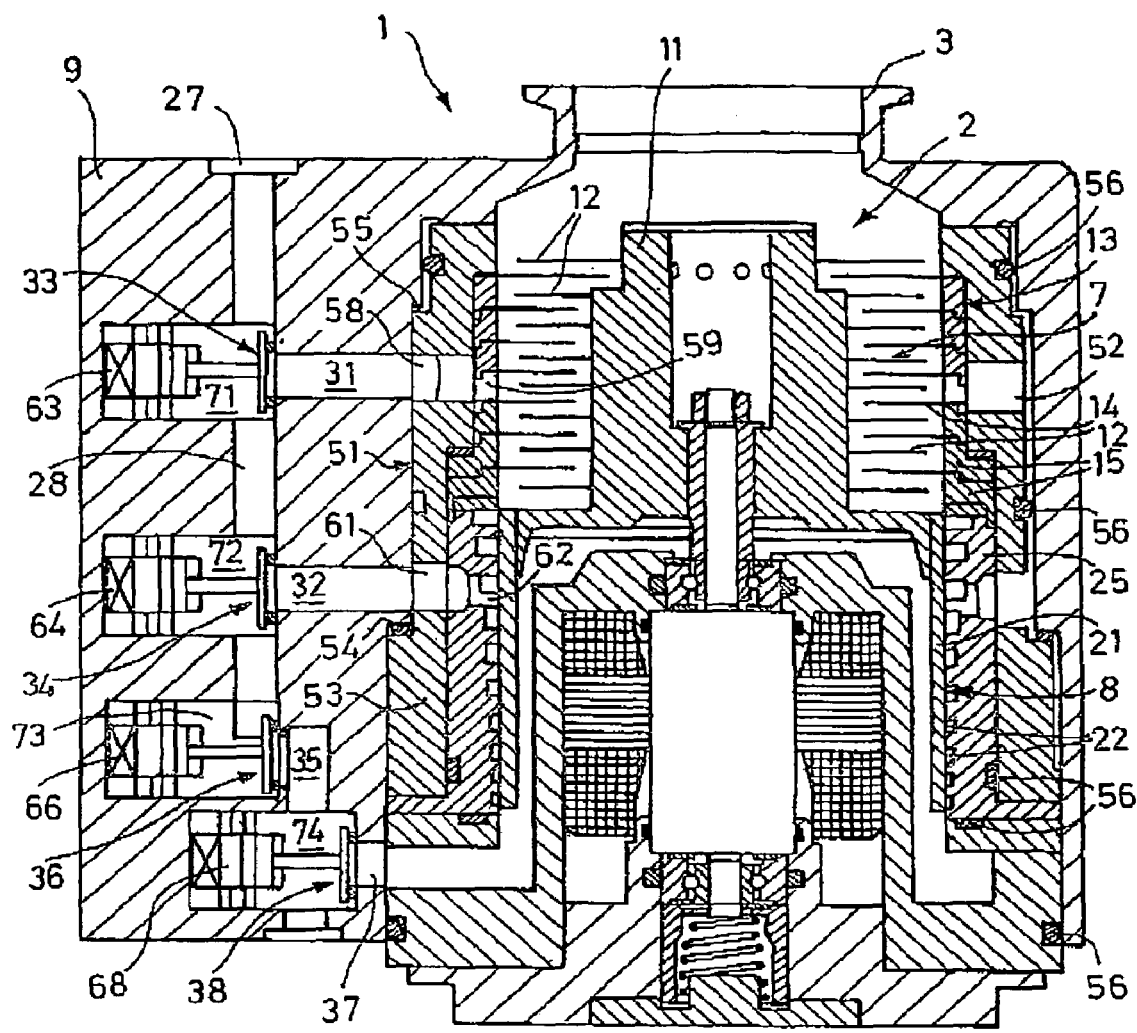
FIG. 2 illustrates a section through an example of an embodiment for a leak detector in accordance with the present invention.

Principal components of the leak detector 1 depicted in FIGS. 1 and 2 are a high-vacuum pump 2 with several stages, a test-gas detector 5 (when employing helium as the test gas, commonly a mass spectrometer) which is connected expediently through a valve 4 (depicted in FIG. 1 only) to the inlet 3 of the high-vacuum pump, as well as a forevacuum pump 6 (depicted in FIG. 1 only). In both Figures, the high-vacuum pump has been designed by way of a compound molecular drag pump which exhibits a turbomolecular pumping stage 7 located on the intake side and a molecular pumping stage 8, for example a screw stage, located on the delivery side. The housing of the leak detector is designated as 9.

Components of the turbomolecular pumping stage are the rotor 11 with its rotor blades 12 as well as the stator 13 with its stator blades 14. The stator blades 14 are held in place between spacing rings 15.

Components of the molecular pumping stage 8 are a rotating cylinder 21, to which on the outside a stator 25 is assigned being equipped with a thread 22.

The inlet of the leak detector 1 is designated as 27. It serves in a basically known manner the purpose of connecting the device under test which is to be searched for leaks, a leak detection chamber or also a sniffer. Downstream of the inlet 27 then follows the conduit 28 through which the gases are sucked in, which in the instance of a defective device under test contain test gas. The test gas conduit 28 is connected through conduit sections 31, 32 each equipped with a valve 33 34, respectively, to the stages 7, 8, respectively, of the high-vacuum 2. Moreover, the conduit 28 is connected through conduit section 35 with valve 36 to the inlet of the forevacuum pump 6. The conduit extending between the outlet of the high-vacuum pump 2 and the inlet of the forevacuum pump 6 is designated as 37. Said conduit is equipped with the valve 38.

A leak detection process is performed as follows: First, the device under test or the leak detection chamber is evacuated with the aid of the forevacuum pump 6 with valve 36 being open—all other valves are closed. Thereafter, by opening the valve 38, gross leak detection commences. Thereafter after closing the valve 36 and opening the valve 34, fine leak detection and finally after opening the valve 33, high sensitivity leak detection can be performed.

The schematic solution in accordance with FIG. 1 depicts also a purge gas connection opening through the conduit 41 with the valve 42 into the conduit 37, whereby through said purge gas connection the leak detector can be purged more rapidly for the purpose of removing interfering residual test gas. Moreover, the leak detector 1 is equipped with a second inlet 43. It is located on the side—and not on the face side like inlet 27—and can be employed alternatively.

The dashed line 45 in FIG. 1 indicates the housing 9 of the leak detector 1 as it is depicted in FIG. 2. It is apparent that the high-vacuum pump 2, the conduits 28, 31, 32, 35, 37 as well as the valves 33, 34, 36, 38 are integrated in housing 9. The dash dot lines 46, 47 in FIG. 1 shall indicate that in addition the forevacuum pump 6 and/or the purge gas valve 42 may be integrated in the housing 9.

Of significance here is the design of the high-vacuum pump 2. It comprises the slide-in module 51, which when ready to operate is located in the corresponding opening 52 in the housing 9. The slide-in module itself comprises principal components of the high-vacuum pump designed by way of a turbomolecular pump (stator, motor, shaft, rotor) which are maintained in place by an external jacket construction 53. The outer shape of the external jacket construction 53 is adapted to the shape of the receiving opening 52 in the housing 9. In the example of the embodiment depicted in FIG. 2, said receiving opening is substantially cylindrical in shape. Outer steps 54, 55 ensure a defined position in the operative state. For the purpose of sealing the gap between external jacket construction 53 and housing 9, respectively opening 52, gaskets 56 are provided.

At the level of the conduit sections 31, 32 the external jacket construction 53 and also the stators 13, 25 of the high-vacuum pumping stages 7, 8 are equipped with passages 58, 59, and 61, 62, respectively. The cross section of these passages which, for example, may extend almost along the entire circumference of the pump and the design of the active pumping surfaces at the level of these passages define the pumping properties of the high-vacuum pump. Shall these be changed, then it is in the instance of the leak detector in accordance with the present invention only required to replace the slide-in module 51.

Components of the leak detector in accordance with the present invention are the valves 33, 34, 36, 38 the closure components of which are integrated in the housing 9. It is expedient when also the drives 63, 64, 66, 68 of these valves be integrated in housing 9. For the purpose of accommodating these drives, the housing 9 offers hollow chambers 71 to 74. Expediently, the housing 9 is partible in a plane cutting these hollow chambers, so that the valves—be it the closure components alone or these together with their drive—can be fitted in a simple manner. Additionally, bores for the control lines need to be present, provided the valves are not actuated by means of a wireless link.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A test-gas leak detector comprising:
   a connection for a device under test, a sniffer, or a leak detector chamber,
   a high-vacuum pump,
   a test-gas detector that is connected on an intake side of said pump,
   a test-gas conduit leading from the connection of the leak detector, said test-gas conduit being connected to at least one intermediate stage of the high-vacuum pump in addition to a pre-vacuum zone of the high-vacuum pump via conduit sections and valves,
   a housing, in which at least some of the conduits and valves and the high-vacuum pump are integrated, forms part of the leak detector,
   a forevacuum pump integrated in the housing, and
   a detachable slide-in module forms part of the high-vacuum pump, the slide-in module having an external jacket construction including passages and, when the leak detector is operational, is situated in a receiving opening that is provided in the housing.

2. The leak detector in accordance with claim 1, wherein with respect to the passages in the external jacket construction,
   corresponding conduit sections are integrated in the housing, and
   valves are located in the test-gas conduit and are capable of being operated from outside the housing.

3. The leak detector in accordance with claim 1, wherein the high-vacuum pump has at least two stages.

4. The leak detector in accordance with claim 3, wherein stators of the two-stage high-vacuum pump define passages at the level of the passages in the external jacket construction.

5. The leak detector in accordance with claim 4, wherein the stator and jacket passages extend circumferentially of the pump.

6. A test-gas leak detector
   a connection for a device under test, a sniffer, or a leak detector chamber,
   a high-vacuum pump,
   a test-gas detector that is connected on an intake side of said pump,
   a test-gas conduit leading from the connection of the leak detector, said test-gas conduit being connected to at least one intermediate stage of the high-vacuum pump in addition to a pre-vacuum zone of the high-vacuum pump via conduit sections and valves,
   a housing, in which at least some of the conduits and valves and the high-vacuum pump are integrated, forms part of the leak detector,
   hollow chambers in the housing valve components, the housing being partible at a plane cutting the hollow chambers, and
   a detachable slide-in module that forms part of the high-vacuum pump, the slide-in module having an external jacket construction including passages and, when the leak detector is operational, is situated in a receiving opening that is provided in the housing.

7. The leak detector in accordance with claim 6, further including
a purge gas valve integrated in the housing.

8. The leak detector in accordance with claim 6, further including
a second test-gas inlet arranged on a side of the housing.

9. The leak detector in accordance with claim 6, wherein the housing includes a cast high-vacuum block.

10. The leak detector in accordance with claim 6, wherein the housing is constructed of plastic material.

11. The leak detector in accordance with claim 6, further including
drives for at least some of the valves integrated in the housing.

12. The leak detector in accordance with claim 11, wherein the valves integrated in the housing are actuated by means of a wireless link.

13. A method for adapting a leak detector having the characteristics of claim 6 to different conditions, wherein the detachable slide-in module is replaced by a different slide-in module having different properties.

14. A leak detector assembly comprising:
a housing defining:
an opening configured for receiving a vacuum pump,
a test-gas conduit extending into the housing from a connector,
a first conduit section extending between the test-gas conduit and the opening,
a second conduit section extending between the test-gas conduit and the opening,
a hollow valve chamber, and
a plane cutting the hollow valve chamber, along which plane the housing is partible;
valves received in the housing hollow valve chamber for controlling gas flow through the first and second conduit section; and
a two-stage vacuum pump slidably receivable in the housing opening, the vacuum pump including:
a first stage having a first stage inlet and a first stage outlet,
a first passage connected to the first stage and which communicates with the first conduit section when the vacuum pump is received in the housing,
a second stage having a second stage inlet connected with the first stage outlet and a second stage outlet, and
a second passage connected to the second stage and which communicates with the second conduit section when the vacuum pump is received in the housing.

15. The leak detector assembly according to claim 14 further including
a third conduit section defined in the housing, the third conduit section connected with the second stage outlet of the vacuum pump received in the opening.

16. The leak detector assembly according to claim 15, further including
valves received in the housing for selectively connecting one of the test-gas conduit and the third conduit section with forevacuum pump.

17. The leak detector assembly according to claim 15 further including
a plurality of vacuum pumps with different pumping characteristics, each of the plurality of vacuum pumps being configured to be interchangeably slidably received in the housing opening.

* * * * *